(12) United States Patent  
Pugh

(10) Patent No.: US 6,385,522 B1
(45) Date of Patent: May 7, 2002

(54) BRAKE CONTROL APPARATUS AND METHOD

(75) Inventor: Gavin Scott Pugh, Hampshire (GB)

(73) Assignee: Elliott Industries Limited, London (GB)

( * ) Notice: Subject to any disclaimer, the term of this patent is extended or adjusted under 35 U.S.C. 154(b) by 0 days.

(21) Appl. No.: 09/462,660

(22) PCT Filed: Jul. 10, 1998

(86) PCT No.: PCT/GB98/02039

§ 371 Date: May 31, 2000

§ 102(e) Date: May 31, 2000

(87) PCT Pub. No.: WO99/02363

PCT Pub. Date: Jan. 21, 1999

(30) Foreign Application Priority Data

Jul. 11, 1997 (GB) ............................................. 9714710

(51) Int. Cl.[7] .............................. B60T 13/74; H02K 7/10
(52) U.S. Cl. .......................... 701/70; 701/79; 318/112; 318/176
(58) Field of Search .............................. 701/70, 78, 79, 701/83; 318/369, 375, 376, 60, 380, 63, 83, 84, 269, 67; 303/112, 176

(56) References Cited

U.S. PATENT DOCUMENTS

| | | | | |
|---|---|---|---|---|
| 4,109,103 A | * | 8/1978 | Farque ........................ | 318/587 |
| 4,415,049 A | * | 11/1983 | Wereb ......................... | 180/6.5 |
| 4,423,363 A | * | 12/1983 | Clark et al. .................. | 318/375 |
| 4,495,449 A | * | 1/1985 | Black et al. .................. | 318/60 |
| 4,511,971 A | * | 4/1985 | Dittner et al. ............... | 364/426 |
| 4,634,941 A | * | 1/1987 | Klimo ......................... | 318/139 |
| 4,725,952 A | * | 2/1988 | Kitano et al. ................ | 364/426 |
| 5,163,170 A | * | 11/1992 | Grabowski ................... | 318/113 |
| 5,345,761 A | * | 9/1994 | King et al. .................... | 60/274 |
| 5,390,992 A | * | 2/1995 | Walenty et al. .............. | 303/112 |
| 5,644,202 A | * | 7/1997 | Toriyama et al. ............ | 318/369 |

FOREIGN PATENT DOCUMENTS

| | | |
|---|---|---|
| DE | 195 17 567 | 11/1995 |
| EP | 0595445 | 5/1994 |
| GB | 2 285 143 | 6/1995 |
| JP | 01 284245 | 11/1989 |
| JP | 03 073145 | 3/1991 |
| WO | WO 93/04888 | 3/1993 |

* cited by examiner

Primary Examiner—Tan Nguyen
Assistant Examiner—Dalena Tran
(74) Attorney, Agent, or Firm—Nickolas E. Westman; Westman, Champlin & Kelly

(57) ABSTRACT

Brake control apparatus and includes an electric motor arranged to drive a wheel and a brake operable to apply a braking force to inhibit the rotation of the wheel. An input signal indicative of a desired angular velocity of the wheel is provided to the control. The current flowing through the electric motor is monitored and a monitoring signal is provided. The power to the electric motor is controlled in response to the input signal by generating a control voltage. After setting the control voltage to zero the brake applies the braking force at a braking time. The braking time may be determined according to the magnitude of the monitoring signal when the control voltage is set to zero, according to the rate of change of the monitoring signal, or according to the polarity of the monitoring signal. An electric vehicle using the brake control apparatus is also disclosed, as is a method of controlling a brake for applying a braking force to inhibit the rotation of a wheel driven by an electric motor.

46 Claims, 13 Drawing Sheets

67 Hz CONTROL LOOP, FEED-FORWARD BRAKING, NON-INTELLIGENT BRAKE APPLICATION.
VEHICLE BRAKING GRAPH (masses: 130kg + 75 kg).

67Hz CONTROL LOOP, FEED-FORWARD BRAKING, INTELLIGENT BRAKING APPLICATION.
VEHICLE BRAKING GRAPH (MASS: 130kg + 75kg).

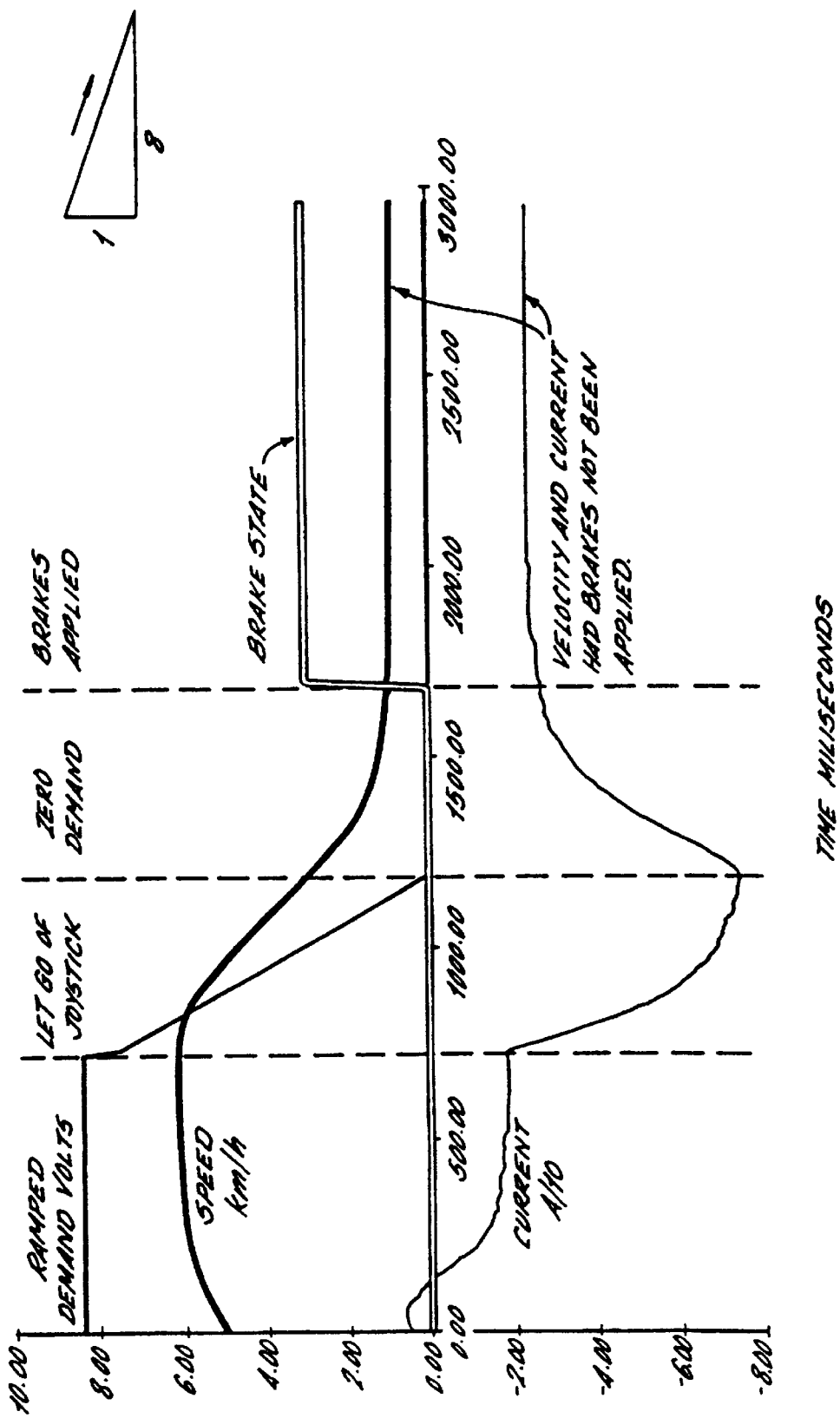
FIG. 9. ALGORITHM 1.
67Hz CONTROL LOOP, FEED-FORWARD BRAKING, IMPROVED BRAKE APPLICATION.
1 IN 8 SLOPE DOWNHILL, VEHICLE BRAKING GRAPH (mass: 130kg + 75kg).

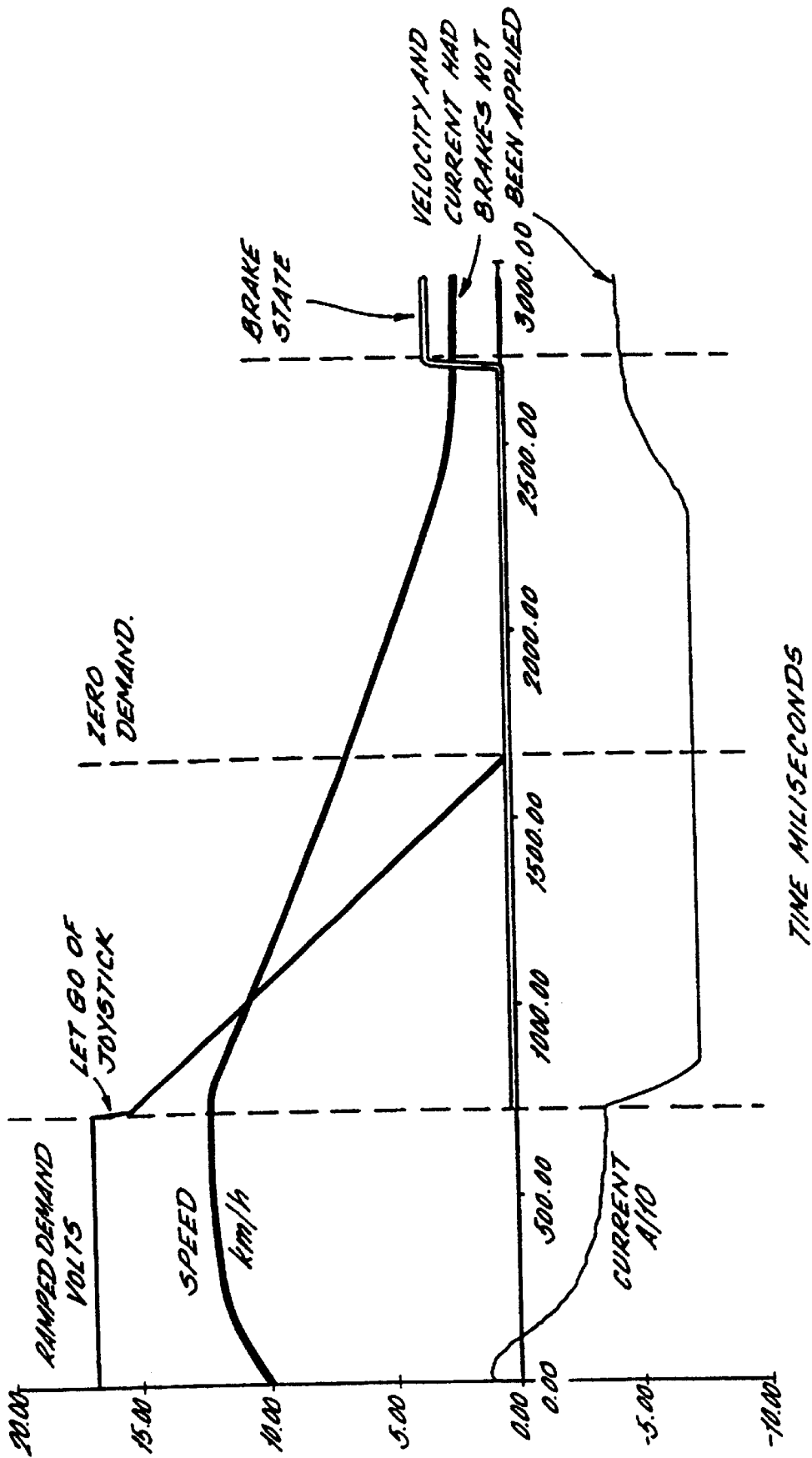
FIG. 10. ALGORITHM 1.
67Hz CONTROL LOOP, FEED-FORWARD BRAKING, IMPROVED BRAKE APPLICATION.
1 IN 4 SLOPE DOWNHILL, VEHICLE BRAKING GRAPH (mass: 130 kg + 75 kg).

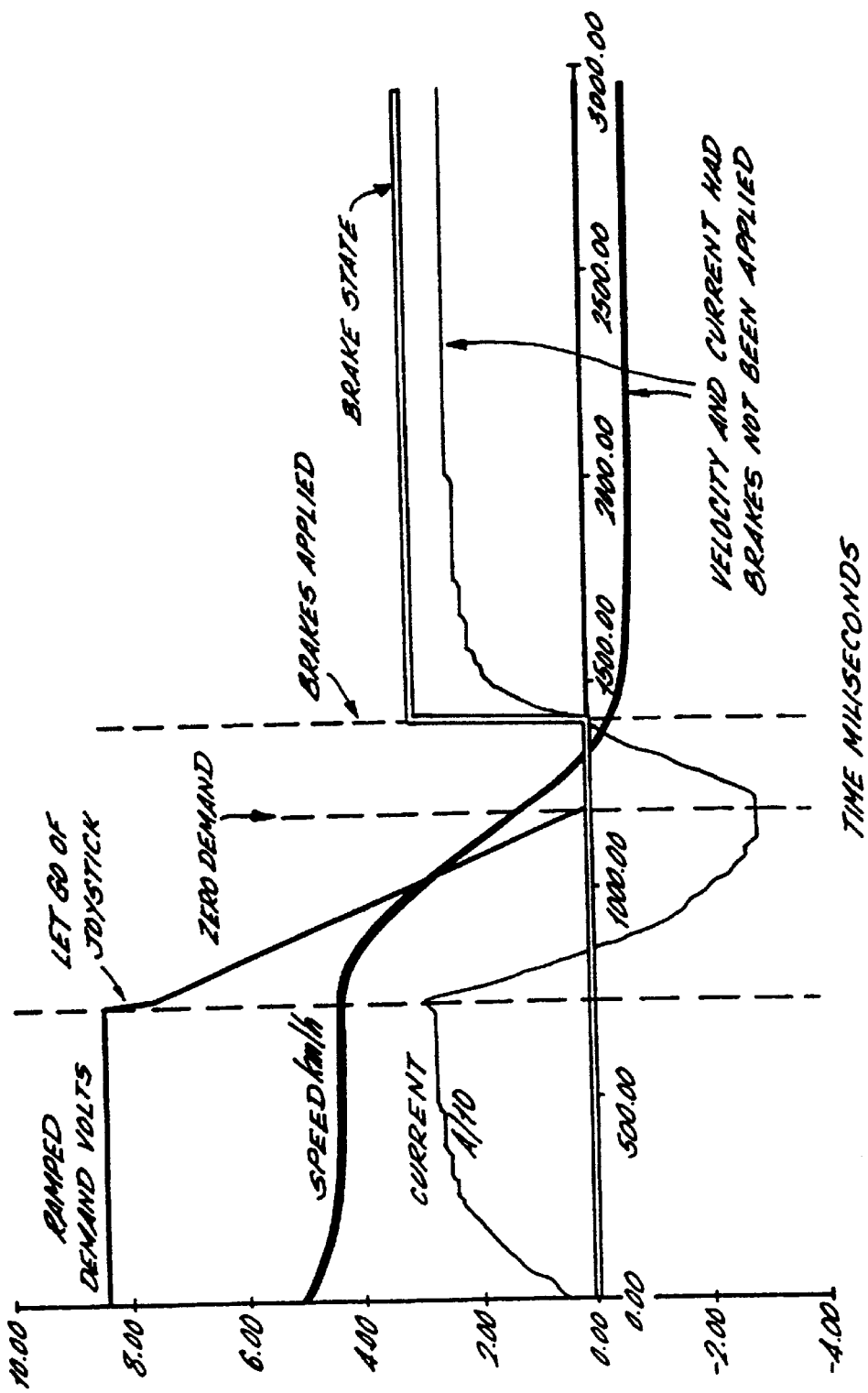
FIG. 14. ALGORITHM 2.
67Hz CONTROL LOOP, FEED-FORWARD BRAKING, IMPROVED BRAKE APPLICATION.
1 IN 8 SLOPE UPHILL. VEHICLE BRAKING GRAPH (mass: 130kg + 75kg).

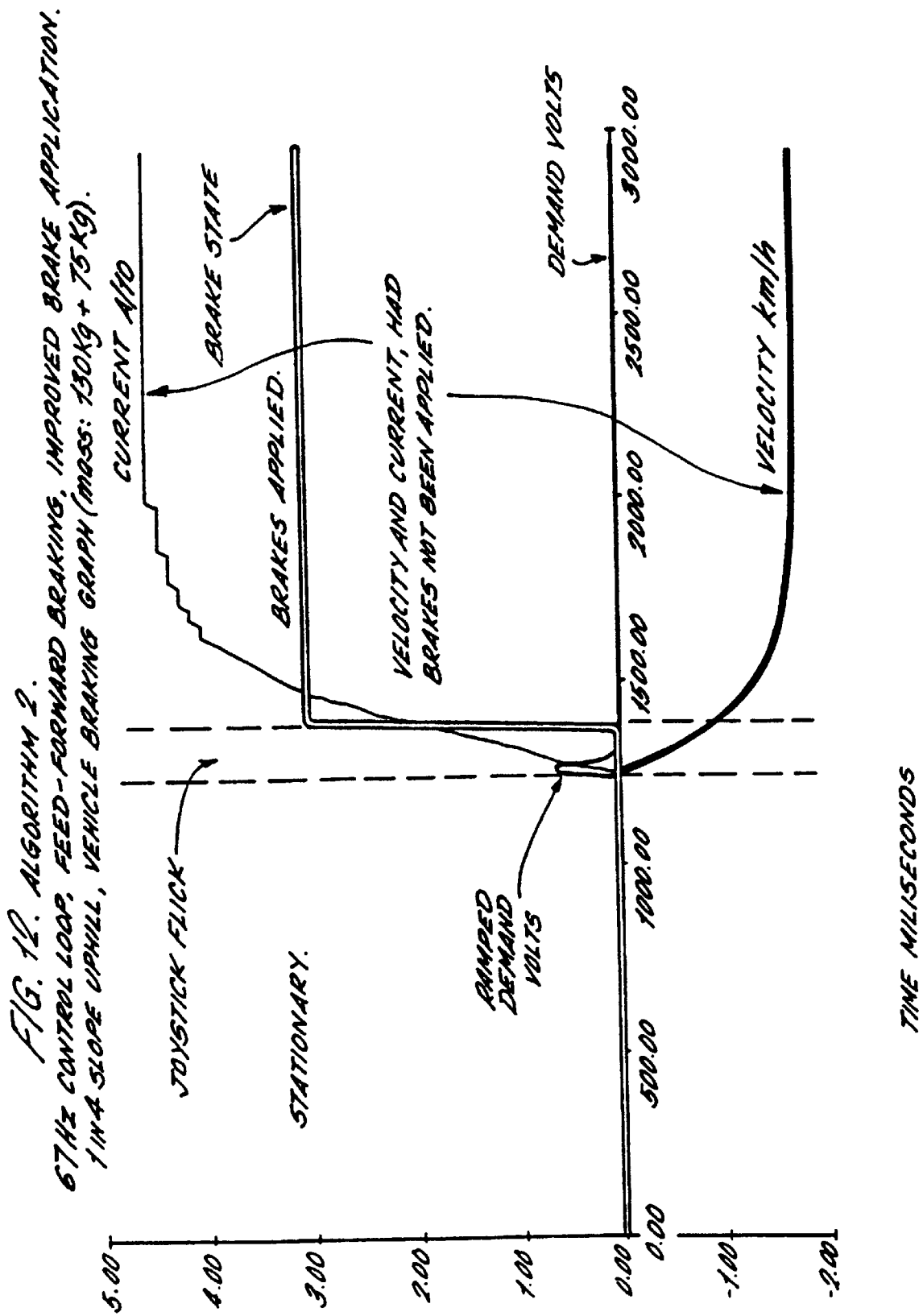

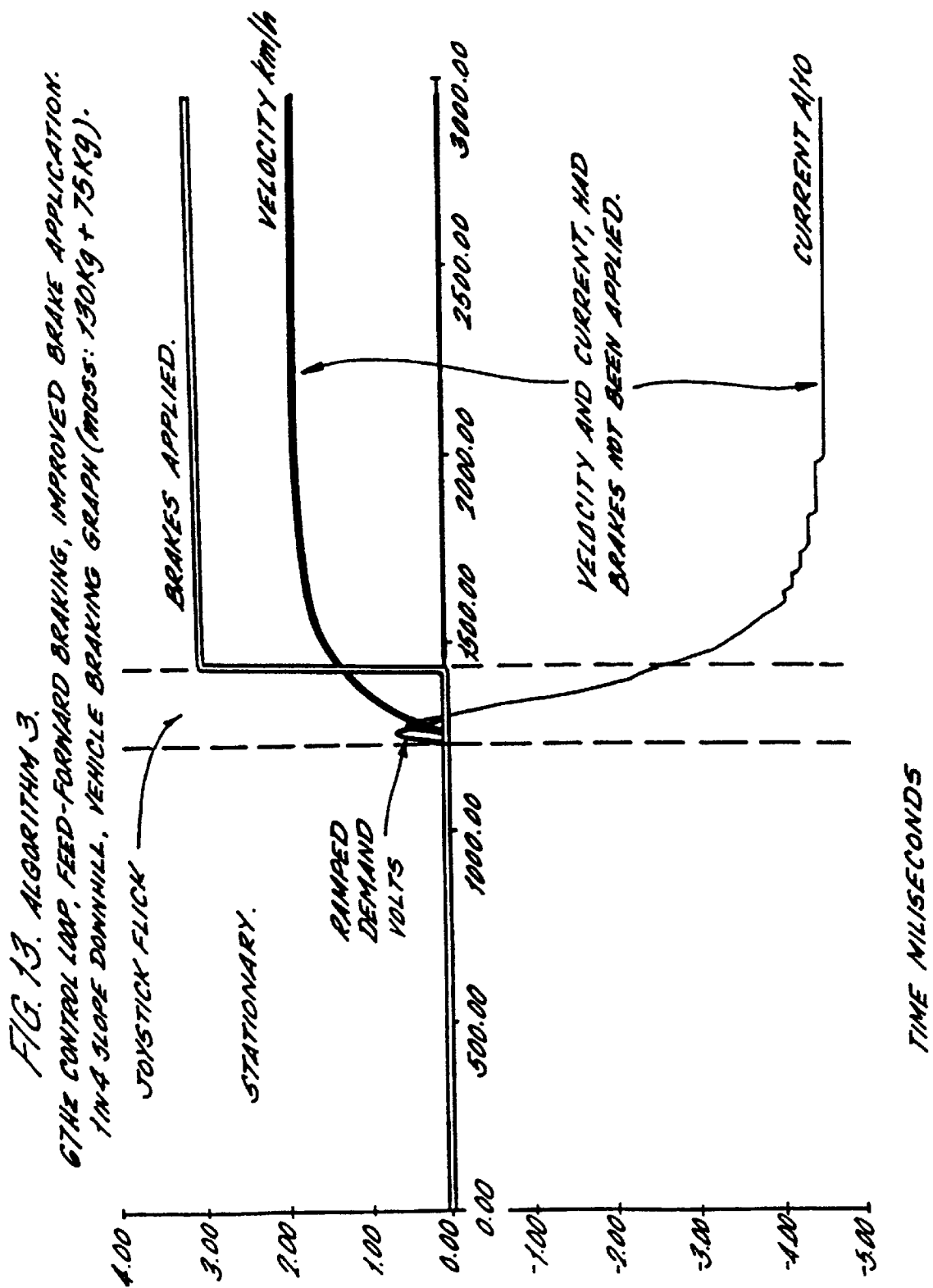

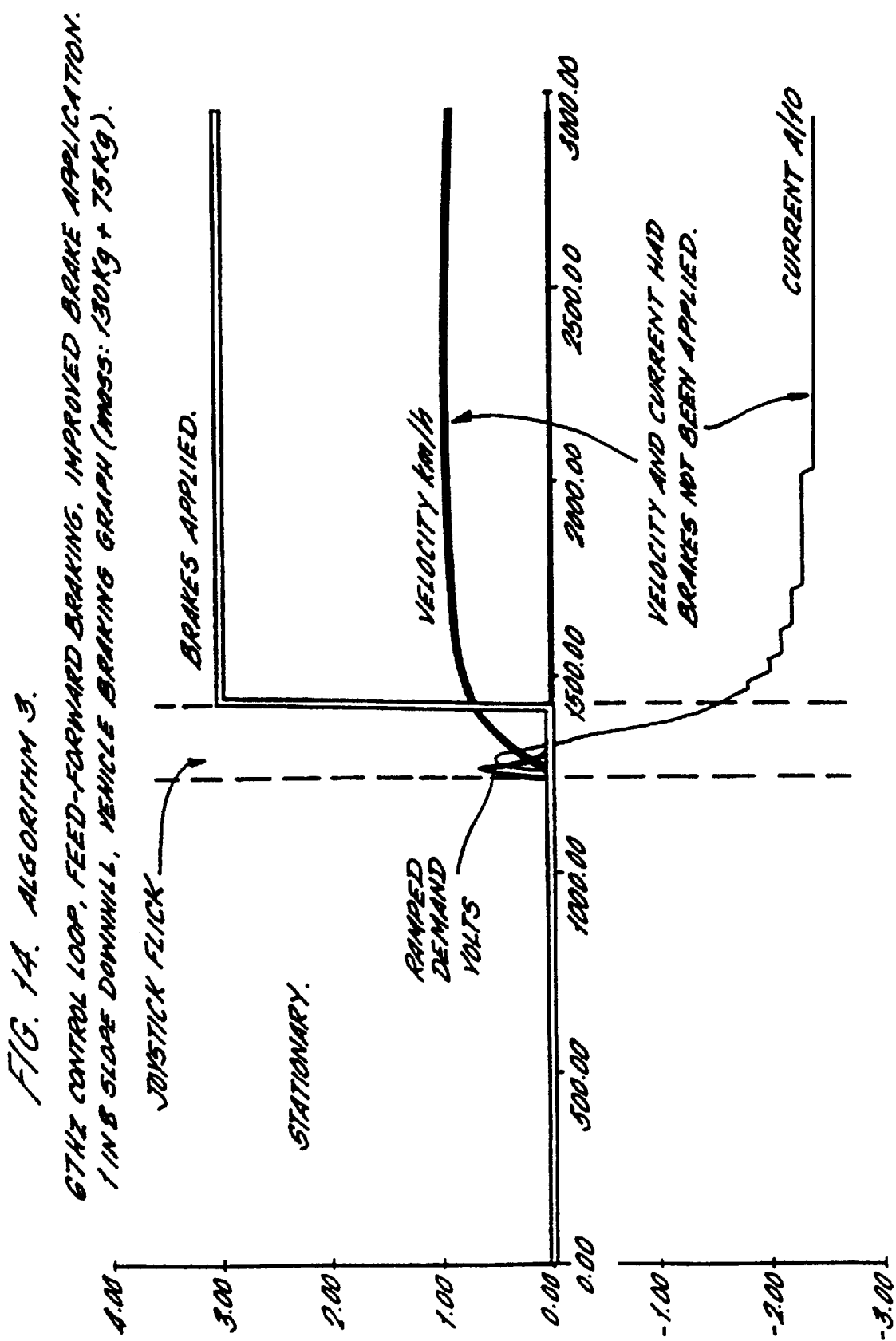
FIG. 14. ALGORITHM 3.
67Hz CONTROL LOOP, FEED-FORWARD BRAKING. IMPROVED BRAKE APPLICATION.
1 IN 5 SLOPE DOWNHILL, VEHICLE BRAKING GRAPH (MASS: 130Kg + 75Kg).

BRAKE CONTROL APPARATUS AND METHOD

This application is a national stage filing under 35 U.S.C. §371 and priority is hereby claimed on International Application No. PCT/GB98/02039, Filed Jul. 10, 1998, which International Application was published in English as No. WO 99/02363.

The present invention relates in general to brake control in apparatus comprising an electric motor arranged to drive a wheel. In particular, although not exclusively, the present invention relates to electric vehicles, and is especially relevant to brushless motor-driven wheelchairs controlled by the user solely by means of a joystick.

The joystick is usually the only means by which the user can control an electric wheelchair. The wheelchair is often fitted with a static brake, that is a brake which ideally is to be applied only when the wheelchair is stationary, to hold the chair and prevent undesired further movement after coming to rest on level or, more importantly, sloping ground.

In the case of wheelchairs in which the wheels are driven directly by brushless dc motors, the static brake is particularly important because of the absence of gearing which would increase rolling resistance and assist in holding the chair when the motor windings were not excited. It is important that the motor controller connected to the joystick can operate the static brakes satisfactorily as the user normally has no direct control over them. Ideally, the static brake should come on immediately-and automatically after the chair has been dynamically slowed by the motors and stopped. Good brake timing prevents rolling backwards or forwards after slowing down on gradients. It also reduces wear on the brakes.

A problem is that on a brushless system often there is no speed feedback of sufficient quality to tell the motor controller when to apply the static brakes (ie. tell the controller that the wheels are revolving slowly enough).

Ideally one would like to monitor the back EMF of the motor, which would of course fall to zero when the motor stopped. However, when the motor is slowing down the voltage measured across its terminals is equal to the back EMF plus IR (where I is the current flowing through the motor and R is the resistance of the motor). Thus, if one tries to calculate the back EMF from this measured voltage for use as a type of speed feedback there are three sources of error: the measurement of the voltage across the motor; the measurement of the current flowing through the motor windings; and the assumed resistance of the motor. The resistance of the motor can vary with temperature, and IR becomes large compared to the back EMF at low speeds when dynamically braking. Accordingly, speed feedback values will become increasingly inaccurate at low speeds. Unfortunately, this is at exactly the point one would like an accurate measure of the speed for the correct timing of static braking.

To add quality speed feedback sensors would be expensive, and so, in the past, other indirect techniques have been employed to guess at the wheelchair's velocity and apply the static brake at an appropriate time.

One of these techniques has been to apply the static brake a fixed time interval after the motor control voltage (set according to signals from the joystick, and which will also be referred to as the demand voltage) has fallen to zero. A disadvantage of this technique is, however, that a fixed time interval suitable for use when the chair is stopping on level ground may be too long when the vehicle is stopping on an uphill slope, resulting in rollback, and too short when the vehicle is stopping on a downhill slope, resulting in the static brake being applied when the chair is travelling at inappropriately high speed, causing wear on the brakes and possible skidding.

It is known to set the fixed time interval according to parameters such as the weight of the user and the weight of the chair, but the problem of ensuring correct static brake application on a variety of slopes remains.

It is an object of embodiments of the present invention to provide apparatus comprising an electric motor arranged to drive a wheel with improved brake control.

It is a further object of embodiments of the present invention to provide an electric vehicle with improved brake control.

It is a further object of embodiments of the present invention to provide an improved brake control method.

According to a first aspect of the present invention there is provided brake control apparatus comprising:

an electric motor arranged to drive a wheel;

brake means operable to apply a braking force to inhibit the rotation of said wheel;

input means operable to generate an input signal indicative of a desired angular velocity of said wheel;

current monitoring means for generating a monitoring signal indicative of a current flowing through said electric motor; and control means, for controlling the supply of power to said electric motor in response to said input signal by generating a control voltage, and for controlling said brake means such that after setting said control voltage to zero said brake means apply said braking force at a braking time determined according to said monitoring signal.

By determining the braking time according to the monitoring signal, which in turn is determined by the motor current, the control means is able to control the brake means to apply the braking force to the wheel at an appropriate time when the wheel is stopping in a variety of load configurations.

The apparatus may be comprised in an electric vehicle, providing the advantage that the control means is able to control the brake means to apply the braking force to the wheel at an appropriate time when the vehicle is stopping on a variety of slopes, thus reducing wear on the braking means and rollback or skidding.

Advantageously the braking time may be determined according to the magnitude of the monitoring signal when the control voltage is set to zero. In the case of electric vehicles, for a range of slopes, the motor regeneration current at this time has been found to be a good indication of the time that the vehicle would take to come to a halt under dynamic braking on the particular slope, after the zero demand point. This current has also been found to be largely independent of the vehicle speed at the start of the stopping process.

The control means may comprise a microprocessor, and the control voltage and braking time may be calculated according to the input signals and monitoring signal respectively.

The control unit may be operable to control the brake means to apply the braking force a delay time interval after setting the control voltage to zero, this delay time interval being determined by the monitoring signal.

The delay time interval may be determined according to the magnitude of the monitoring signal substantially at the time when the control voltage is set to zero, and this delay time interval may be increased as the magnitude of the monitoring signal at this time increases over at least a range of values.

Again, in the case of electric vehicles, the motor regeneration current at this time has been found to be a good indication of the time that the vehicle would take to come to a halt under dynamic braking on a particular slope, and by increasing the delay time interval with increasing monitoring signal the control means is able to operate the brake at a time appropriate to the slope.

In embodiments of the present invention where the control unit comprises a microprocessor, the delay time interval may be calculated according to the monitoring signal, and advantageously may be calculated according to an algorithm which includes the step of calculating a quantity which is proportional to the magnitude of the motor current when the control voltage is set to zero, i.e. at the time the control voltage substantially reaches zero in response to the input signal having reached a value indicative of the user wishing to stop the rotation of the wheel.

Of course, the delay time interval may also be dependent on the sign of the monitoring signal.

The algorithm may include the step of calculating a quantity which is linearly dependent on the magnitude of the monitoring signal at the time when said control voltage is set to zero.

Advantageously, for safety, the delay time interval may have a predetermined maximum length.

In further embodiments, the braking time may be determined according to the rate of change of the monitoring signal. Thus, after the control voltage has fallen to zero, the control unit may monitor the rate of change of the motor current, and operate the brake at a braking time determined according to the rate of this change. This enables improved brake application timing to be achieved, as it has been found that there is a distinctive change in motor current at the end of its deceleration period, i.e. just as the wheel is coming to rest.

Advantageously, the braking time may be determined according to the time at which the rate of change of the monitoring signal reaches a predetermined value.

The braking time may be substantially the time at which the rate of change of the monitoring signal reaches the predetermined value, or alternatively may be set a predetermined time interval after this time.

The predetermined value and/or the predetermined time interval may be preprogrammed.

Advantageously, the braking time may be determined according to the polarity of the monitoring signal, and may be substantially the time at which the monitoring signal changes polarity.

Advantageously, the control unit may be operable to control the brake means to apply the braking force a predetermined maximum time delay after the control voltage has fallen to zero.

The value of the control voltage at a particular time may be dependent on previous input signals, and the control voltage may be determined by smoothing and filtering the input signals.

The electric vehicle may be an electric wheelchair, and the input means may comprise a joystick.

The control means may be operable to apply a drive voltage across the windings of the electric motor, this drive voltage being determined by the control voltage. The drive voltage may be proportional to the control voltage and may be pulse width modulated.

Advantageously, the electric motor may be a brushless dc electric motor and may have an external rotor connected directly to the wheel.

The electric motor and the brake means may be integral.

According to a second aspect of the present invention there is provided an electric vehicle comprising:

a wheel;

an electric motor arranged to drive the wheel;

brake means operable to apply a braking force to inhibit the rotation of said wheel;

input means operable to generate an input signal indicative of a desired angular velocity of said wheel;

slope monitoring means for generating a monitoring signal indicative of the slope of the ground on which the vehicle is standing; and control means, for controlling the supply of power to said electric motor in response to said input signal by generating a control voltage, and for controlling said brake means such that after setting said control voltage to zero said brake means apply said braking force at a braking time determined according to said monitoring signal.

According to a third aspect of the present invention there is provided a method of controlling brake means for applying a braking force to inhibit the rotation of a wheel driven by an electric motor, the method comprising the steps of:

setting a control voltage for controlling said electric motor according to an input signal indicative of a desired angular velocity of said wheel;

monitoring a current in said motor;

setting said control voltage to zero in response to said input signal;

determining a braking time according to said current; and controlling said brake means to apply said braking force at said braking time.

Embodiments of the present invention will now be described with reference to the accompanying drawings in which:

FIG. 9 shows the results of a computer simulation of the slowing down and stopping on a 1 in 8 downhill slope of an electric vehicle in accordance with an embodiment of the present invention;

FIG. 10 shows the results of a computer simulation of the slowing down and stopping on a 1 in 4 downhill slope of an electric vehicle in accordance with an embodiment of the present invention;

FIG. 11 shows the results of a computer simulation of the slowing down and stopping on a 1 in 8 uphill slope of an electric vehicle in accordance with an embodiment of the present invention;

FIG. 12 shows the results of a computer simulation of the response of an electric vehicle in accordance with an embodiment of the present invention on a 1 in 4 uphill slope to a joystick flick;

FIG. 13 shows the results of a computer simulation of the response of an electric vehicle in accordance with an embodiment of the present invention on a 1 in 4 downhill slope to a joystick flick; and FIG. 14 shows the results of a computer simulation of the response of an electric vehicle in accordance with an embodiment of the present invention on a 1 in 8 downhill slope to a joystick flick.

Figure 1:
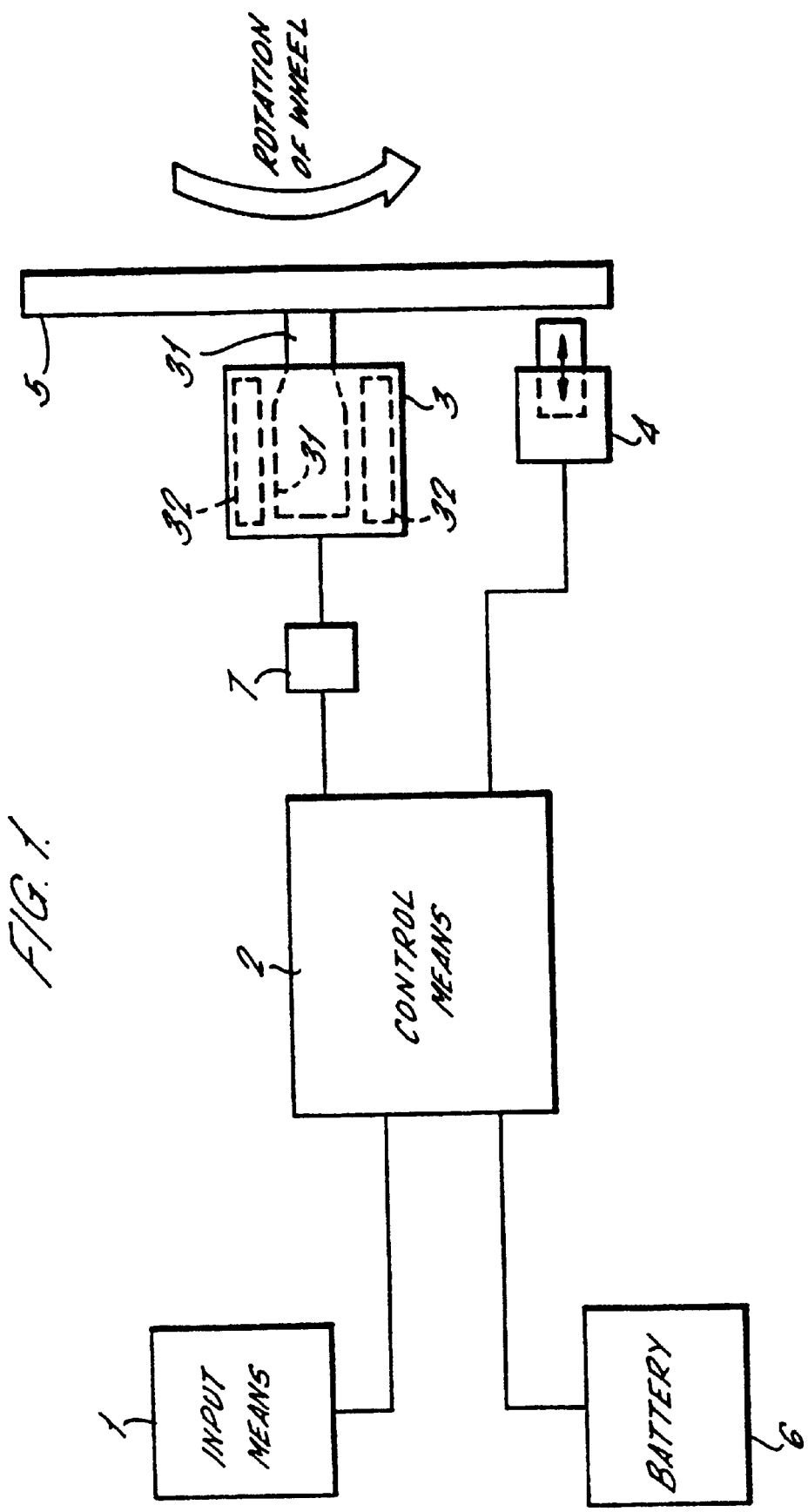
FIG. 1 is a schematic diagram of the components of an electric vehicle in accordance with an embodiment of the present invention.

Referring now to FIG. 1, an electric vehicle in accordance with an embodiment of the present invention comprises input means 1, a control unit 2, an electric motor 3 arranged to drive a wheel 5, brake means 4 operable to apply a braking force to inhibit the rotation of the wheel 5, a battery 6, and current monitoring means 7 for generating a monitoring signal indicative of the current flowing through the electric motor 3. The current monitoring means 7 is external to the control unit 2, but in alternative embodiments the two are integral.

In this embodiment the wheel 5 is connected directly to the rotor 31 of the motor 3, although in alternative embodiments the rotor 31 and wheel 5 may be connected indirectly by means of gears. The motor 3 shown in FIG. 1 has an external stator 32 and internal rotor 31, although again in alternative embodiments the rotor 31 may be external with the stator 32 inside, as shown in FIG. 2.

Figure 2:
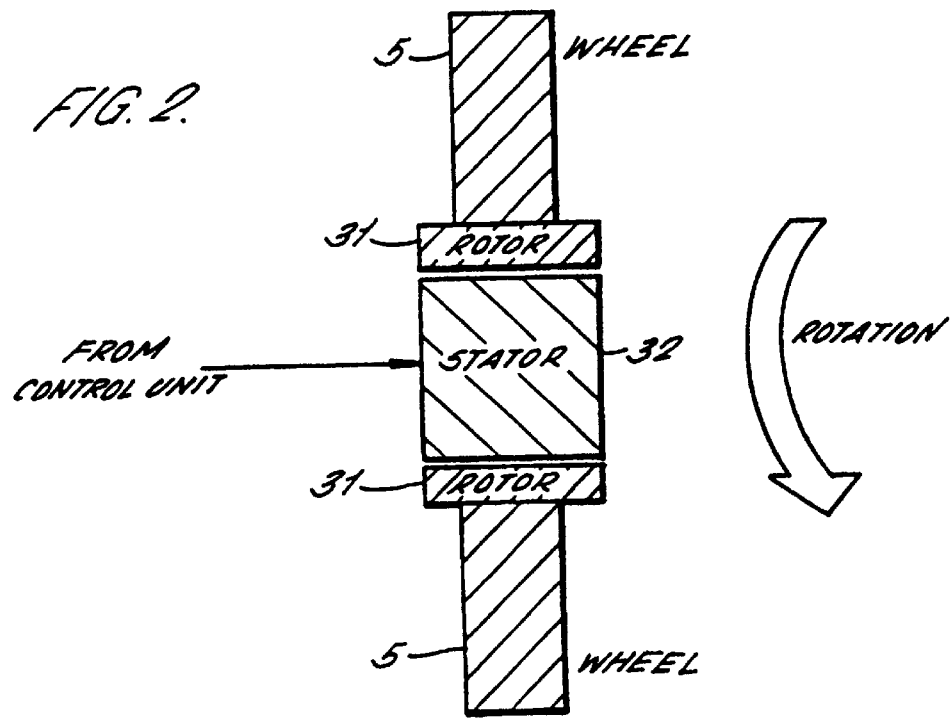
FIG. 2 shows a highly schematic cross sectional diagram of an electric motor, suitable for use in embodiments of the present invention, with an internal stator and an external rotor connected directly to a wheel.

The electric motors shown in FIGS. 1 and 2 are brushless dc motors, but in alternative embodiments brushed motors may be used. However, brushless motors provide the advantage that there are no problems with brush wear or commutator arcing.

In the embodiment shown in FIG. 1, the control unit 2 (which may alternatively be referred to as the "controller") controls the commutation of the stator windings 32 and calculates a motor control voltage according to input signals received from the input means 1. The motor control voltage may also be called a demand voltage. The control unit 2 produces an output voltage dependant on this motor control voltage and applies this output voltage across the motor windings to control the motor speed.

In this embodiment the output voltage is pulse width modulated (PWM), with a mark:space ratio determined by the motor control voltage. The time averaged magnitude of the output voltage over a period in which the motor control voltage is constant may be proportional to the magnitude of the motor control voltage during that period. The output voltage may be determined according to the motor control voltage but with some additional compensation for the resistance of the motor windings.

In the embodiment shown in FIG. 1 the input means 1 is a joystick but it will be apparent that in alternative embodiments other input means may be used, for example levers, dials or pedals, or indeed the input means could comprise a remote controller incorporating a transmitter, with the control unit incorporating a receiver. Equally, although only one wheel 5 and motor 3 are shown, it will be apparent that the vehicle may comprise a plurality of motors and wheels, which may be driven at different angular velocities to turn the vehicle in response to appropriate signals from the joystick.

By operating the joystick 1, that is by moving it from its equilibrium, or rest position (to which it is usually sprung) a user can send a signal to the control unit indicative of a desired angular velocity of the wheel. However, in this embodiment the control unit is arranged so that the motor control voltage is not simply proportional to the input signal at a particular instant. In order to prevent rapid changes in input signal from resulting in jerky vehicle motion, the maximum rate at the motor control voltage can change is limited. In effect, the motor control voltage is a smoothed and filtered version of the input signal. The input signal is a demand signal and the control voltage is a demand voltage.

In this embodiment the control unit 2 comprises a microprocessor and the smoothing and filtering is achieved by software processing of the input signal. The input signals arriving at the control unit 2 are analogue signals, but in alternative embodiments the input signals are digital. In further embodiments where the input signals arriving at the control unit are analogue, the smoothing and filtering is achieved directly using hardware.

Returning to the embodiment shown in FIG. 1, the motor control voltage, although calculated in accordance with input signals, is not simply proportional to those input signals. The dependence, or relationship, between the calculated motor control voltage and input signals from the joystick is determined by the programming of the controller, i.e. the software.

When the control voltage falls to zero (and by this it is meant that the control voltage falls substantially to zero, i.e. to within a certain threshold of zero) the control unit 2 controls the brake means 4 to apply a braking force to the wheel 5 at a braking time calculated according to the monitoring signal. Thus, the control voltage and braking time are determined by the programming of the microprocessor. This programming may be altered to change the dynamic performance of the vehicle, including its braking characteristics, in response to input signals.

Figure 3:
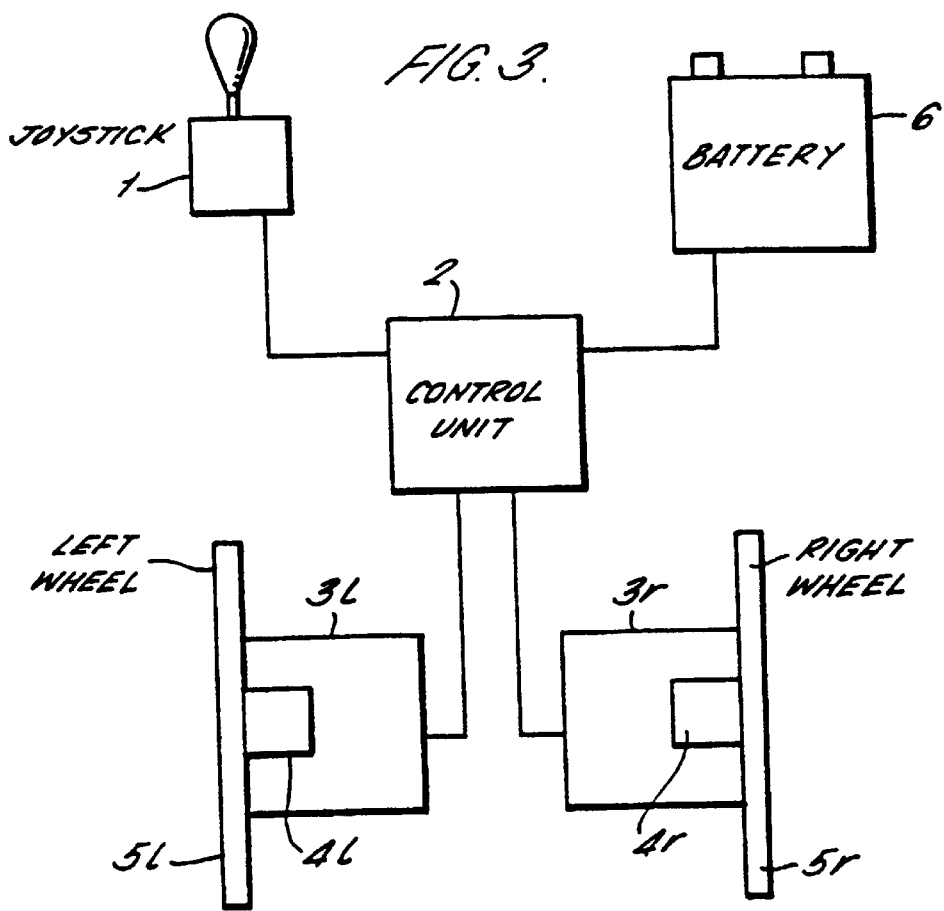
FIG. 3 is a schematic diagram of an electric wheelchair in accordance with an embodiment of the present invention.

Referring now to FIG. 3, an electric wheelchair in accordance with an embodiment of the present invention comprises a joystick 1, a control unit 2, a battery 6, and two electric motors 3*l*,3*r*. On each side of the wheelchair the respective motor 3*l*,3*r* and brake 4*l*,4*r* are integral and the respective wheel 5*l*,5*r* is connected directly to the respective motor's rotor. Steering the wheelchair is achieved by controlling the motors 3*l*,3*r* to rotate at different angular velocities according to signals from the joystick 1.

Figure 4:
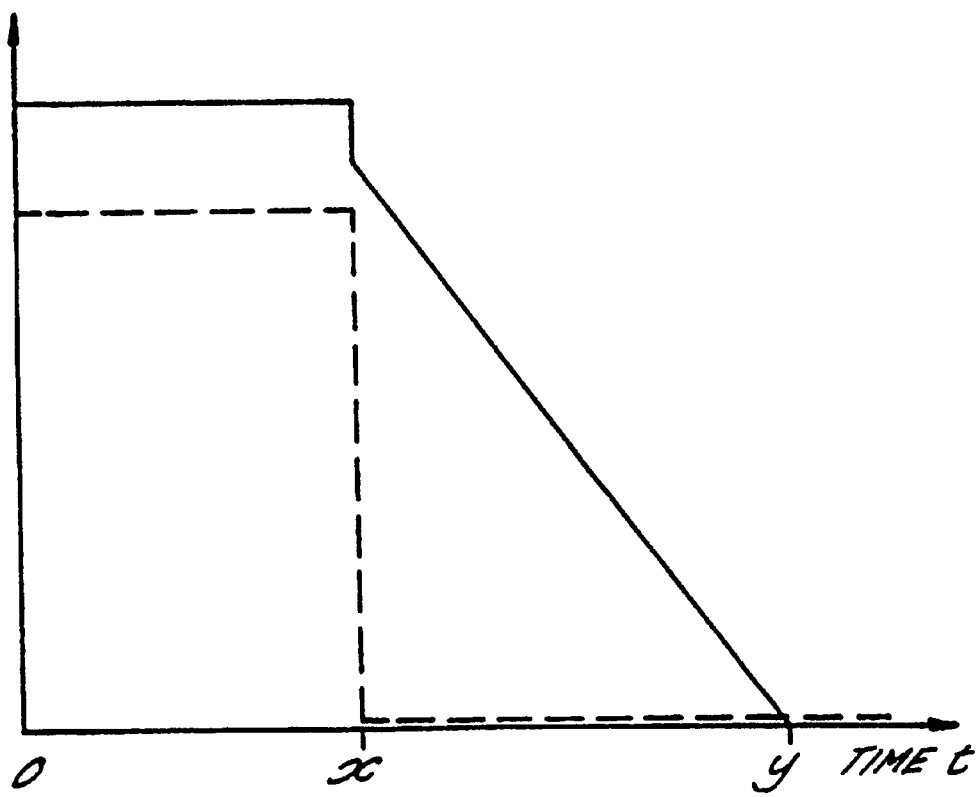
FIG. 4 is a graph showing the software controlled variation in motor control voltage corresponding to a given variation in joystick signal in a control unit suitable for use in embodiments of the present invention.

It is known to program a controller to give a motor control voltage variation in response to an abrupt change or step in input signal as shown in FIG. 4. Embodiments of the present invention comprise control units programmed in this way. When the joystick is returned to neutral the speed demand (i.e. the control voltage) returns to zero at a preprogrammed deceleration rate according to the particular drive program in use. In FIG. 4 the broken line shows the variation in input signal with time, and from t=0 to t=x the input signal is at a maximum, corresponding to the user pushing the joystick fully forwards. During this time interval the motor control voltage is constant, and also at its maximum value.

At time t=x, the user lets go of the joystick, indicating that he wishes the vehicle to stop. The joystick signal falls to zero and remains at this level indefinitely. In this example, the controller contains a microprocessor and the resulting change in motor control voltage is determined by software processing of the input signal.

In response to the sudden drop in input signal at t=x, the controller software causes the motor control voltage also to drop abruptly, not all the way to zero, but by a calculated amount. The purpose of this drop is to reduce the current flowing in the motor quickly in order to flatten out the motor current profile with time during slow-down under dynamic braking and help linearise deceleration. Then, the controller slowly ramps the motor control voltage down at a predetermined rate resulting in a substantially uniform deceleration and high ride quality. Only at time t=y does the motor control voltage finally reach zero.

Thus, at a particular time, the value of the motor control voltage is dependent on previous input signals.

Computer simulations of the slowing down performance of electric vehicles incorporating controllers programmed to give the above described motor control voltage variation in response to joystick signals dropping to zero have been performed for various gradients from −1 in 4 to +1 in 4.

In these simulations the electric motors have been controlled by a motor control voltage, calculated according to the motor controller software (with some motor resistance compensation). The motor control voltage is calculated from the joystick input signals, and is filtered and ramped in a conventional manner.

From the simulations several features were found:
1. The vehicle always comes to a halt after the motor control voltage goes to zero.
2. The motor current at the time of zero motor control voltage is generally independent of the initial speed before slowing. This current is also known as the motor regeneration current because at this point motor current is in the opposite sense to that flowing when the motor is driven in the forward direction. The regeneration current depends mostly on the slope conditions that the vehicle slows down on.
3. If the vehicle is coming to a halt while travelling downhill the motor regeneration current is higher than usual. More time is needed for the motors to stop the vehicle before the static brakes are applied.
4. If the vehicle is coming to a halt while travelling uphill the motor regeneration current is lower than usual. Less time is needed for the motors to stop the vehicle before the static brakes are applied.

Thus, for a wide range of slopes the magnitude of the motor regeneration current at the moment when the control voltage falls to zero has been found to be a useful indication of the time the vehicle will take to come to rest under dynamic braking.

In an embodiment of the present invention, the control unit comprises a microprocessor programmed with software which includes an algorithm for determining when to apply the static brake during slowing down based on the regeneration motor current history. The algorithm extrapolates the dynamic performance of the vehicle to predict the zero speed position-regardless of slope conditions.

The algorithm generates a dynamic delay between the point in time when the motor control voltage in the controller reaches zero and the point when the brake is applied. This delay is calculated according to the value of motor current at the point when the motor control voltage reaches zero (i.e. it falls to within a predetermined threshold of zero).

The algorithm is such that, over at least a range of currents, the greater the motor current at the moment when motor control voltage is zero, the longer is the delay time. Thus the brake can be applied at a time very close to the time when the vehicle would come to rest under dynamic braking on the particular slope. Such an algorithm will be referred to as an "intelligent algorithm" and the control of brakes by a control unit programmed with such a algorithm will be referred to as "intelligent brake control".

Without an intelligent algorithm and without any speed feedback, prior art arrangements have used a constant delay (non intelligent brake application), i.e. they have applied the static brake a fixed time interval after the control voltage has fallen to zero.

For level/flat travelling a non intelligent brake algorithm can apply the brakes with a 300 ms delay (after the motor control voltage has fallen to zero) satisfactorily. When the slope of the terrain changes, however, a non intelligent brake application will not be able to cope.

FIGS. 5, 6, 7 and 8 show four computer simulation graphs illustrating the difference between non-intelligent static brake application in a prior art arrangement and intelligent brake application in an embodiments of the present invention. The control unit of this embodiment is programmed to calculate a delay time according to the algorithm:

BrakeDelay=LevelBrakingDelay−
(LevelBrakingCurrent−((LeftCurrent−
LeftCurrentZero)+(RightCurrent−RightCurrentZero)))

where:
BrakeDelay is the time between the control voltage (i.e. the ramped voltage demand) becoming zero and the static brake application;

LevelBrakingDelay is a constant equal to the desired delay for level braking;

LevelBrakingCurrent is a constant equal to a typical dynamic level braking current (i.e. it is representative of a typical value of the motor current at the time when the control voltage reaches zero when stopping on level ground);

LeftCurrent is the current sensor reading of the current in the motor driving the left wheel at the zero demand point;

LeftCurrentZero is the current sensor reading when the motors are turned off (i.e. when the motor current is zero);

RightCurrent is the current sensor reading of the current in the right motor at the zero demand point; and RightCurrentZero is the current sensor reading when the right motor is turned off.

If the delay calculated is more than half a second then the control unit limits the delay to half a second. If the delay calculated is less than 15 milliseconds then the delay is limited to 15 milliseconds.

Figure 5:
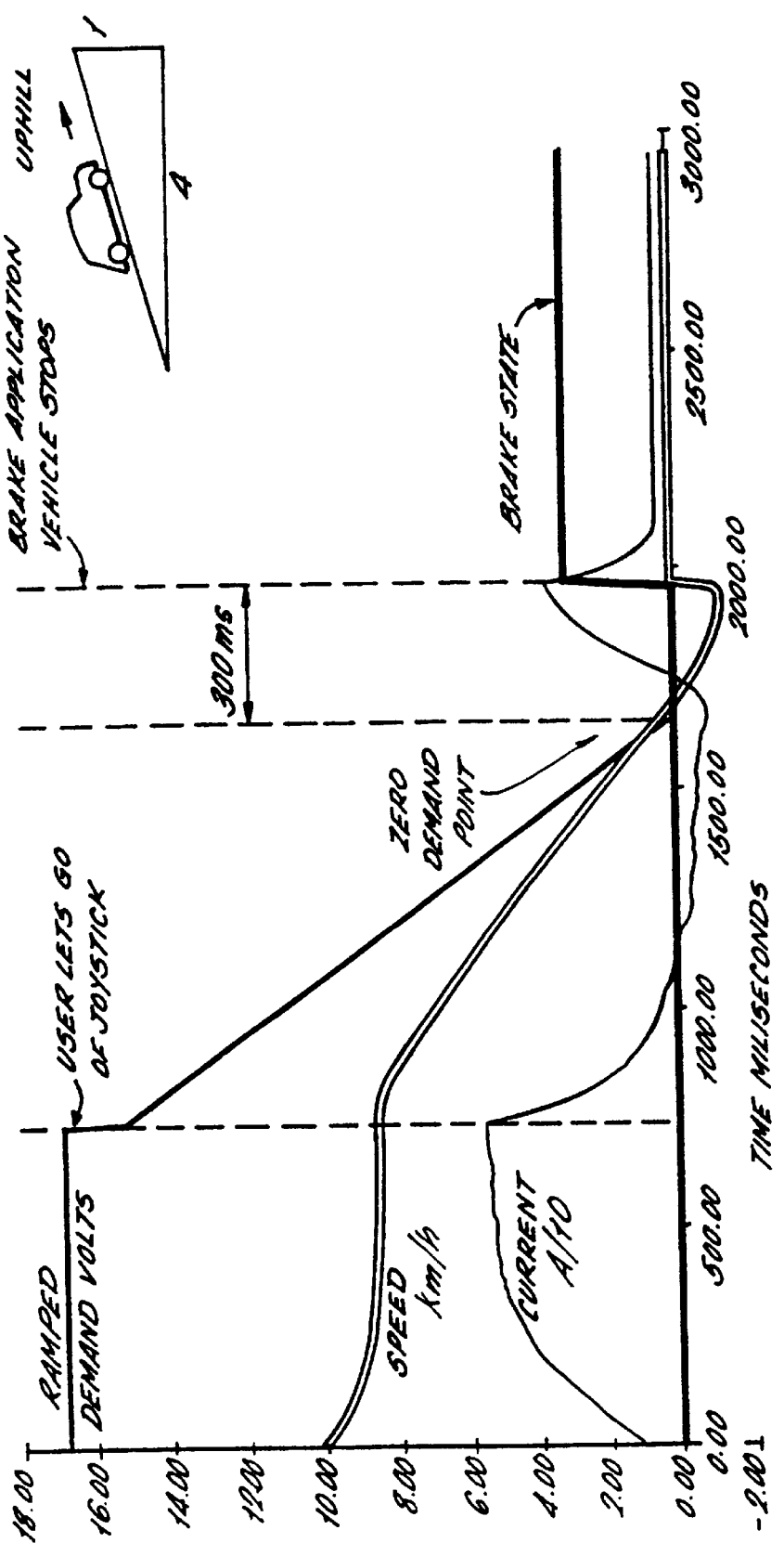
FIG. 5 shows the results of a computer simulation of the slowing down and stopping on a 1 in 4 uphill slope of an electric vehicle in accordance with the prior art.

In each case, prior to t=0 the wheelchair is assumed to have been travelling on level ground with uniform speed of 10 kilometres per hour, motor current of 10 amps, and a motor control voltage of approximately 17 volts, corresponding to a constant signal from the joystick. At t=0 the vehicle encounters the respective slope and the joystick signal (not shown) is held constant for a further 750 ms. At t=750 ms, the input signal drops substantially to zero (simulating the user letting go of the joystick) and remains at zero for the remainder of the time interval shown in the simulation. Also, in each case, the respective vehicle's control unit is programmed to give the same variation in motor control voltage in response to the joystick signal dropping to zero as was shown in FIG. 3 (with x=750 ms, y=1700 ms). The results of the simulation show how the controller-calculated motor control voltage, the speed of the vehicle, motor current and brake state vary in response to this variation in joystick signal as the vehicle slows down and stops. In FIG. 5 the vehicle is coming to rest after beginning travelling up a 1 in 4 slope at t=0. The non-intelligent brake application applies the brakes 300 ms after the motor control voltage has fallen substantially to zero. The vehicle reverses direction before braking and finishes by skidding in reverse.

Figure 6:
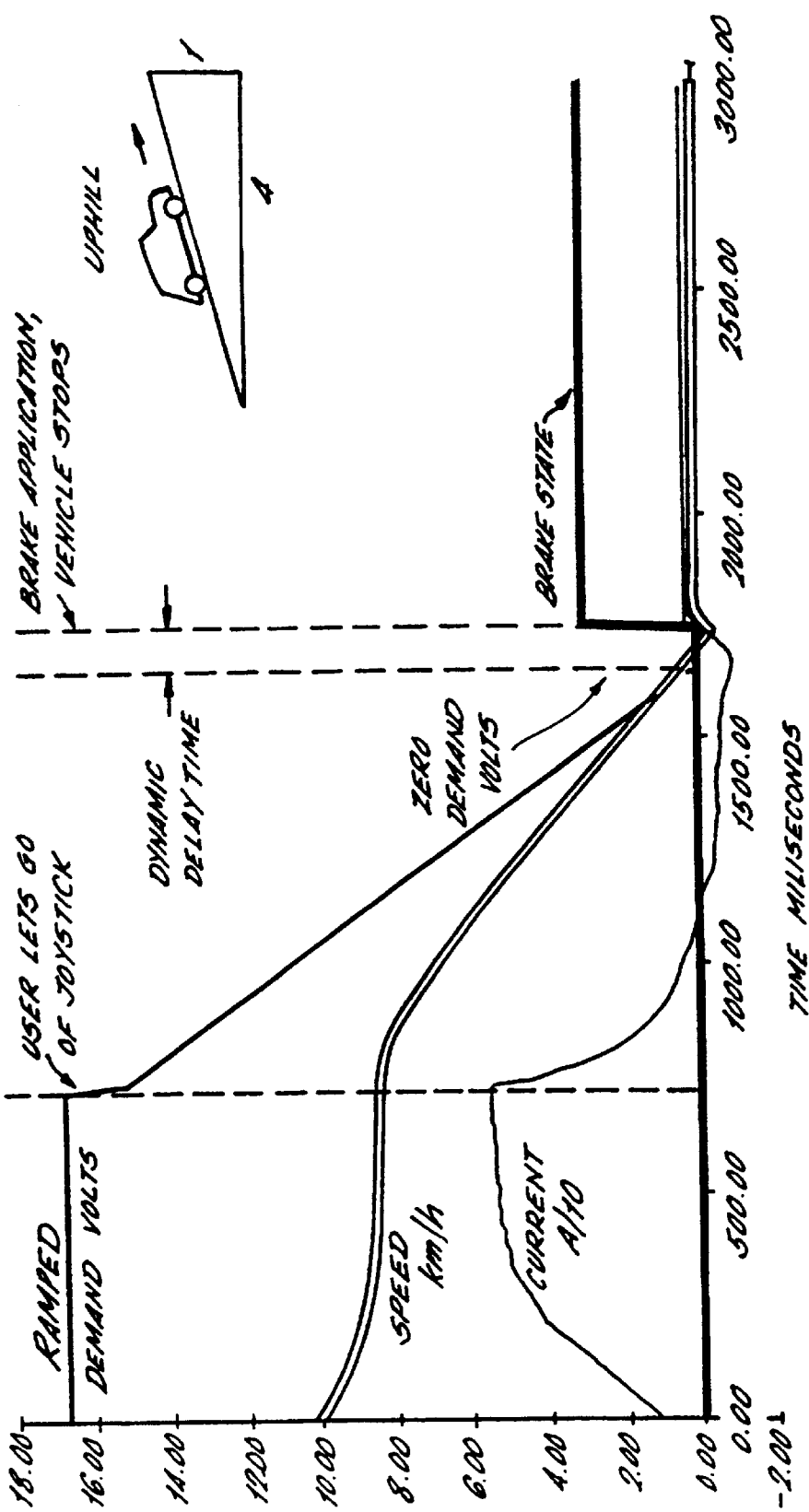
FIG. 6 shows the results of the computer simulation of the slowing down and stopping of a 1 in 4 uphill slope of an electric vehicle in accordance with an embodiment of the present invention.

In FIG. 6, the situation is the same as in FIG. 5 but this time the vehicle controller is programmed to calculate an intelligent brake delay. The motor current at the zero motor voltage point is smaller than would be the case if the vehicle were coming to rest on level ground, and accordingly the delay time interval calculated by the controller is smaller than the delay appropriate for level stopping (typically 300 ms). Thus the brakes are applied before the vehicle starts to roll backwards. As can be see on the graph the current only goes slightly negative when stopping uphill.

Figure 7:
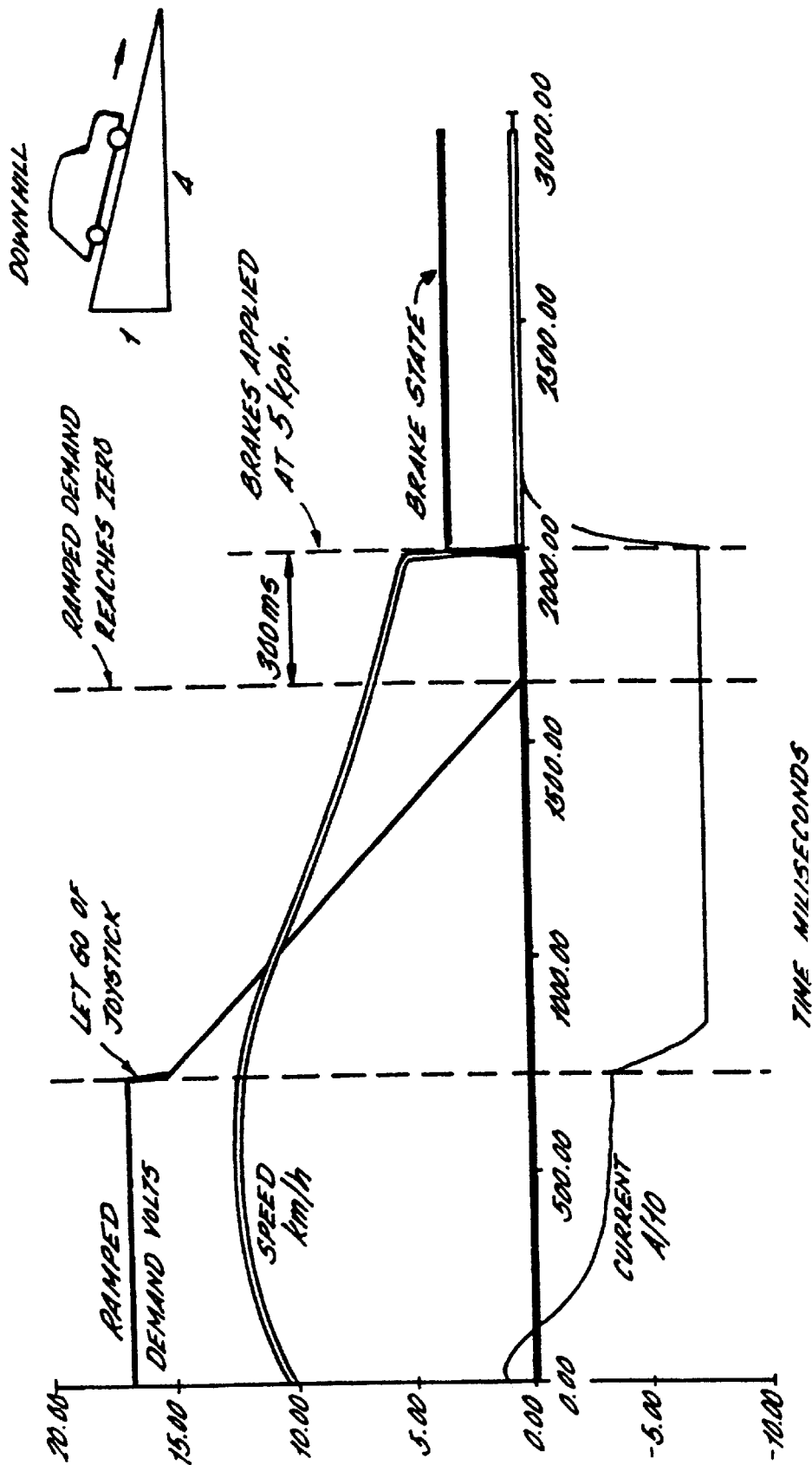
FIG. 7 shows the results of a computer simulation of the slowing down and stopping on a 1 in 4 downhill slope of an electric vehicle in accordance with the prior art.
Figure 8:
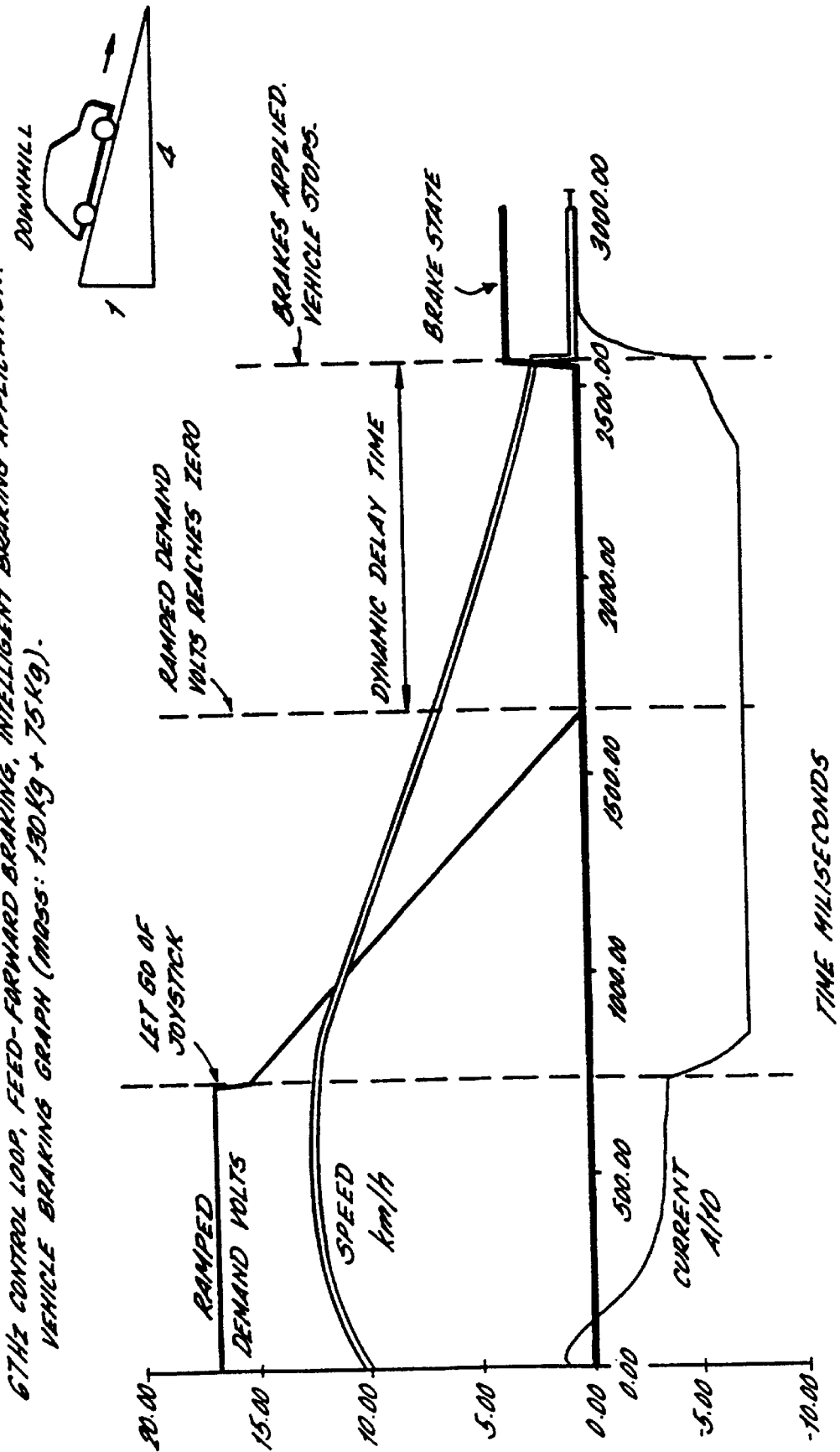
FIG. 8 shows the results of a computer simulation of the slowing down and stopping on a 1 in 4 downhill slope of an electric vehicle in accordance with an embodiment of the present invention.

In FIG. 7 the vehicle is now travelling down a 1 in 4 slope. The non-intelligent brake application locks up the brakes at 300 ms after the zero motor control voltage point. The vehicle's motor has not slowed it down sufficiently and it now skids out of control. In contrast, in the vehicle embodying the present invention with intelligent brake application (see FIG. 8), the calculated delay time is longer than normal (ie. greater than the 300 ms for level stopping) because of the increased magnitude of motor regeneration current at the zero motor control voltage point. Accordingly, the brake is applied much later, giving the motor time to slow the vehicle to a more manageable speed.

As a safety feature, the maximum length of the delay time may be limited.

Thus, in certain embodiments of the present invention, the braking time is determined by the magnitude of the monitoring signal, which in turn is indicative of the current flowing through the motor. The monitoring signal may simply be proportional to motor current, corresponding to the voltage across a resistor connected in series with the motor.

In alternative embodiments the braking time is determined according to the rate of change of the monitoring signal.

Computer simulations show a distinctive change in motor current at a point just before static brake application is desired. This point marks the end of the deceleration period of the vehicle. It gives a good unmistakable signal whether going uphill or downhill even where the vehicle may not be able to stop fully under dynamic braking alone.

In one embodiment, after setting the control voltage to zero the control unit waits for the rate of change of motor current to reach a predetermined value and then operated the brake. The braking time may be substantially the same as the time at which the predetermined value is reached, or may be a predetermined or preprogrammed time interval after that time.

In a further embodiment, the control unit monitors the motor current by repeatedly sampling the monitoring signal at constant time intervals and applies the static brake after the zero motor control voltage point, when:

$$Ip-In>It$$

where Ip is the previous value of the monitoring signal, In is the most recent value of the monitoring signal, and It is a predetermined differential constant.

Again, in embodiments of the present invention in which the braking time is determined by the rate of change of motor current, as a safety measure the control unit may apply the brake a fixed maximum time interval after the motor control voltage has fallen to zero, even if a predetermined dI/dt has not been reached.

In an electric vehicle in accordance with a further embodiment of the present invention, the control means calculates the braking time according to a more sophisticated algorithm. The improved algorithm is much more complex and relies on continuous monitoring of the current sensors during braking to determine the point of brake application.

It consists of three individual algorithms logically OR-ed together so that if any one of the algorithms is triggered the static brakes will be applied.

The first algorithm detects the end of the deceleration phase when dynamic braking. This algorithm is good for braking downhill, on the level, and on slight uphill slopes. This is the point when the vehicle tries to settle into a constant speed. The algorithm looks for a high then low deceleration current and applies the static brakes. The algorithm takes the form of the following:

The static brakes are applied when the FilteredDiffCurrent value (defined below) after the zero demand volts point has surpassed a high threshold and then gone below a small threshold, the thresholds being 10 and 6 respectively (of course these levels are arbitrary and may be different in other embodiments). In the "C" programming language, for example, this algorithm would look like a loop with the following code residing in the loop. The code would only run after the zero demand voltage point, and the brakes are applied when all conditions are true:

IF (FilteredDiffCurrent=10)
HighThresholdFlag=true);
IF ((FilteredDiffCurrent<6) &&
(PreviousFilteredDiffCurrent>=6) &&
(HighThresholdFlag=true))
LowThresholdFlag=true;
IF (Lowthreshold=true && HighThreshold=true)
    StaticBrakeApplied=true;
where:
DiffCurrent=Difference between present Current reading and that of 150 ms previously; FilteredDiffCurrent=the previous FilteredDiffCurrent added to $^{35}/_{128}$ of the difference between the PreviousFilteredDiffCurrent and the DiffCurrent; and PreviousFilteredDiffCurrent is the previous reading of FilteredDiffCurrent.

The value of DiffCurrent is filtered in FilteredDiffCurrent to prevent noise in the current sensors upsetting the triggering process for the static brake.

Simulations of this algorithm in action are shown on the graphs in FIGS. 9 and 10. Notice the flattening of the current curve near the braking point. This is the characteristic that this first algorithm looks for to control the static break.

The second algorithm is orientated at braking on uphill slopes. It detects a change in direction e.g. rollback by looking at the polarity of the current feedback. When the vehicle slows down and then starts to roll backwards the current compensation in the software reacts. The current compensation makes the current in the motors positive to counteract the backwards motion.

This second algorithm simply detects any positive current reading from the current sensors after the zero demand point and applies the static brakes. This can be seen on the graphs in FIGS. 11 and 12. It can be seen that the brakes are applied as soon as the current becomes positive. Logically, the brake controlling code could take the form:

IF ((VoltageDemand=zero) && (MotorCurrent>zero))
    StaticBrakeApplied=true;

The third algorithm detects a special situation where the user is facing down a slope. The vehicle is initially stationary, facing downhill. The user flicks the joystick so that the brakes come off and the vehicle begins to roll forward. The demand volts soon returns to zero but the speed of the vehicle is increasing because of the slope. The best solution would be to turn on the brake as soon as the demand volts reaches zero. In order to recognise this situation the algorithm has to look for a particular current signature. The characteristic of this problem is a negative current with a negative FilteredDiffCurrent value, indicating increasing forward velocity forced against the current compensation.

In this particular example, the algorithm is only active 45 milliseconds after the zero demand point to allow the current compensation time to react against the motion resulting from the slope. The algorithm can be expressed in code as:

IF (time>45) AntiForwardRollDetectionFlag=true;

IF ((AntiForwardRollDetectionFlag=true) && (Current<0) && (FilteredDiffCurrent<-5)) StaticBrakeApplied=true;

Computer simulations of this algorithm in action are shown in the graphs in FIGS. 13 and 14. It can be seen that the current becomes increasingly negative very quickly after the zero demand volts point.

It should be noted that all of the computer simulation graphs in FIGS. 9 to 14 show the results of all three algorithms working together at the same time. However, they have been selected to show examples of situations when one algorithm triggers static braking before the other two. Also, none of the algorithms can trigger the brake before the zero demand voltage point (zero motor control voltage point) although data like FilteredDiffCurrent may be calculated/integrated before the zero demand point is reached. Alternatively, the calculations may not commence until the control voltage has been set to zero, in response to the user indicating, via the input means, a desire to stop.

For safety reasons, the delay between the zero demand point and the static brake application can be limited, and all of the above algorithms are subject to a time limit.

Embodiments of the present invention are by no means limited to using algorithms in the exact form of those described above, which are intended for illustration. It will be apparent that the form of the algorithms may vary.

In embodiments of the present invention, the brake time may be determined according to a plurality of algorithms, each algorithm corresponding to a respective monitoring signal signature characteristic of motor deceleration under a particular load.

In yet another embodiment, an electric vehicle comprises slope detection means and the controller determines a braking time according to signals from the slope detection means.

The slope detection means may, for example, be a simple mercury switch, although of course alternative means may be employed. The braking time may be delayed if a signal indicative of a downhill slope is received, and increased if a signal corresponding to an uphill slope is received.

It will be apparent that embodiments of the present invention are not limited to electric wheelchairs. The vehicle may, for example, be any vehicle from a list including: a car, a golf buggy, or a child's toy. It will also be apparent that the present invention is not limited to electric vehicles. It is relevant to a wide variety of systems in which an electric motor is controlled to drive a "wheel", such as in an electric hoist.

The term "wheel" is used in a very broad sense, and is intended to encompass a wide variety of rotating members driven by an electric motor.

What is claimed is:

1. Brake control apparatus comprising:
   an electric motor arranged to drive a wheel;
   a static brake operable to apply a braking force to inhibit the rotation of said wheel;
   input means operable to generate an input signal indicative of a desired angular velocity of said wheel;
   current monitoring means for generating a monitoring signal indicative of a current flowing through said electric motor; and
   control means, for controlling the supply of power to said electric motor in response to said input signal by generating a control voltage, and for controlling said static brake such that after setting said control voltage to zero said static brake applies said braking force at a braking time determined according to said monitoring signal.

2. Apparatus in accordance with claim 1, wherein said control means comprises a microprocessor, said control voltage is calculated according to said input signals, and said braking time is calculated according to said monitoring signal.

3. Apparatus in accordance with claim 2, wherein said control means is operable to control said static brake to apply said braking force a delay time interval after setting said control voltage to zero, said delay time interval being determined according to said monitoring signal.

4. Apparatus in accordance with claim 3 wherein said delay time interval is determined according to the magnitude of said monitoring signal when said control voltage is set to zero.

5. Apparatus in accordance with claim 4 wherein said control means is arranged to increase said delay time interval as the magnitude of said monitoring signal when said control voltage is set to zero increases over at least a range of magnitudes.

6. Apparatus in accordance with claim 5 wherein said delay time interval is linearly dependent on the magnitude of said monitoring signal when said control voltage is set to zero over at least a range of magnitudes.

7. Apparatus in accordance with claim 3, wherein said delay time interval is calculated according to said monitoring signal.

8. Apparatus in accordance with claim 7, wherein said delay time interval is calculated according to an algorithm which includes the step of calculating a quantity which is proportional to the magnitude of the motor current when said control voltage is set to zero.

9. Apparatus in accordance with claim 7, wherein said delay time interval is calculated according to an algorithm which includes the step of calculating a quantity which is linearly dependent on the magnitude of said monitoring signal when said control voltage is set to zero.

10. Apparatus in accordance with claim 3, wherein said delay time interval has a predetermined maximum length.

11. An electric vehicle comprising apparatus in according with claim 3.

12. An electric vehicle in accordance with claim 11, wherein said delay time interval is calculated according to an algorithm which includes the step of calculating a value proportional to the quantity:

$$BD-(BC-(C-CZ))$$

where:
   BD is a constant representing a braking delay suitable when the vehicle is stopping on level ground;
   BC is a constant representing a typical value of the monitoring signal at the time when the control voltage is set to zero when the vehicle is stopping on level ground;

C is the magnitude of said monitoring signal at the time when the control voltage is set to zero; and CZ is the magnitude of the monitoring signal when the motor current is zero.

13. An electric vehicle in accordance with claim 11, wherein said electric vehicle is an electric wheelchair.

14. Apparatus in accordance with claim 1 wherein said braking time is determined according to the magnitude of said monitoring signal when said control voltage is set to zero.

15. Apparatus in accordance with claim 1, wherein said braking time is determined according to the rate of change of said monitoring signal.

16. Apparatus in accordance with claim 15, wherein said braking time is determined according to the time at which the rate of change of said monitoring signal reaches a predetermined value.

17. Apparatus in accordance with claim 16 wherein said braking time is substantially the time at which the rate of change of said monitoring signal reaches said predetermined value.

18. Apparatus in accordance with claim 16, wherein said braking time is a predetermined time interval after the time at which the rate of change of said monitoring signal reaches said predetermined value.

19. Apparatus in accordance with claim 1, wherein said braking time is determined according to the polarity of said monitoring signal.

20. Apparatus in accordance with claim 19, wherein said braking time is substantially the time at which said monitoring signal changes polarity.

21. Apparatus in accordance with claim 1, wherein said control means is operable to control said static brake to apply said braking force a predetermined maximum time interval after setting said control voltage to zero.

22. Apparatus in accordance with claim 1, wherein the value of said control voltage at a particular time is dependent on previous values of said input signal.

23. Apparatus in accordance with claim 1, wherein said input means comprises a joystick.

24. Apparatus in accordance with claim 1 wherein said control means is operable to apply a drive voltage across the windings of said electric motor, said drive voltage being determined by said control voltage.

25. Apparatus in accordance with claim 24 wherein said drive voltage is proportional to said control voltage.

26. Apparatus in accordance with claim 24 wherein said drive voltage is pulse width modulated.

27. Apparatus in accordance with claim 1 wherein said electric motor is a brushless dc electric motor.

28. Apparatus in accordance with claim 1 wherein said electric motor and said static brake are integral.

29. Apparatus in accordance with claim 1 wherein said electric motor has an external rotor connected directly to said wheel.

30. Apparatus in accordance with claim 1 wherein said braking time is determined according to a plurality of algorithms, each algorithm corresponding to a respective monitoring signal signature characteristic of motor deceleration under a particular load.

31. An electric vehicle comprising:
a wheel;
an electric motor arranged to drive the wheel;
a static brake operable to apply a braking force to inhibit the rotation of said wheel;
input means operable to generate an input signal indicative of a desired angular velocity of said wheel;
slope monitoring means for generating a monitoring signal indicative of the slope of the ground on which the vehicle is standing; and
control means, for controlling the supply of power to said electric motor in response to said input signal by generating a control voltage, and for controlling said static brake such that after setting said control voltage to zero said static brake applies said braking force at a braking time determined according to said monitoring signal.

32. A method of controlling a static brake for applying a braking force to inhibit the rotation of a wheel driven by an electric motor, the method comprising the steps of:
setting a control voltage for controlling said electric motor according to an input signal indicative of a desired angular velocity of said wheel;
monitoring a current in said motor;
setting said control voltage to zero in response to said input signal;
determining a braking time according to said current; and
controlling said static brake to apply said braking force at said braking time.

33. A method in accordance with claim 32 wherein said step of determining comprises the step of determining said braking time according to the magnitude of said monitoring signal when said control voltage is set to zero.

34. A method in accordance with claim 32 wherein said step of setting comprises the step of calculating said control voltage according to said input signal, and said step of determining comprises the step of calculating said braking time according to said monitoring signal.

35. A method in accordance with claim 32, wherein said step of determining said braking time comprises the step of determining a delay time interval according to said monitoring signal, and said step of controlling comprises the step of controlling said static brake to apply said braking force said delay time interval after setting said control voltage to zero.

36. A method in accordance with claim 35, wherein said delay time interval is determined according to the magnitude of said monitoring signal when said control voltage is set to zero.

37. A method in accordance with claim 36, wherein said delay time interval increases as the magnitude of said monitoring signal when said control voltage is set to zero increases over at least a range of magnitudes.

38. A method in accordance with claim 35 wherein said step of setting comprises the step of calculating said control voltage according to said input signals, and said step of determining said delay time interval comprises the step of calculating said delay time interval according to said monitoring signal.

39. A method in according with claim 35, wherein said step of determining said delay time interval comprises the step of calculating a quantity which is proportional to the magnitude of the motor current when said control voltage is set to zero.

40. A method in accordance with claim 35, wherein said step of determining said delay time interval comprises the step of calculating a quantity which is linearly dependent on the magnitude of said monitoring signal when said control voltage is set to zero.

41. A method in accordance with claim 35, wherein said step of determining said delay time comprises the step of determining said braking time according to the rate of change of said monitoring signal.

42. A method in accordance with claim 41, wherein said braking time is determined according to the time at which the rate of change of said monitoring signal reaches a predetermined value.

43. A method in accordance with claim 42 wherein said braking time is substantially the time at which the rate of change of said monitoring signal reaches said predetermined value.

44. A method in accordance with claim 42 wherein said braking time is a predetermined time interval after the time at which the rate of change of said monitoring signal reaches said predetermined value.

45. A method in accordance with claim 32, wherein said braking time is determined according to the polarity of said monitoring signal.

46. A method in accordance with claim 32, further comprising the step of controlling said static brake to apply said braking force a predetermined maximum length of time after setting said control voltage to zero.

* * * * *